United States Patent [19]
Dugan

[11] Patent Number: 5,225,928
[45] Date of Patent: Jul. 6, 1993

[54] FOCUS COMPENSATING LENS FOR USE IN EXTREME TEMPERATURES

[75] Inventor: John P. Dugan, Cincinnati, Ohio

[73] Assignee: Spectra-Physics Laserplane, Inc., Dayton, Ohio

[21] Appl. No.: 772,068

[22] Filed: Oct. 7, 1991

[51] Int. Cl.⁵ ............................................. G02B 7/02
[52] U.S. Cl. ................... 359/356; 359/719; 359/820; 359/900
[58] Field of Search ............... 359/356, 744, 795, 719, 359/820, 900; 372/32

[56] References Cited

U.S. PATENT DOCUMENTS

| | | | |
|---|---|---|---|
| B1 4,221,483 | 8/1991 | Rando | 356/250 |
| 4,062,634 | 12/1977 | Rando et al. | 356/248 |
| 4,221,483 | 9/1980 | Rando | 356/250 |
| 4,834,472 | 5/1989 | Palmer | 359/744 |

*Primary Examiner*—Bruce Y. Arnold
*Assistant Examiner*—Hung Xuan Dang
*Attorney, Agent, or Firm*—Killworth, Gottman, Hagan & Schaeff

[57] ABSTRACT

A focus compensating lens structure wherein a lens means for collimating laser light produced by a source has an index of refraction which varies with temperature and wavelength to compensate for temperature effects on the wavelength of light produced by the laser source and the length of the mounting on which the source and lens are disposed.

20 Claims, 2 Drawing Sheets

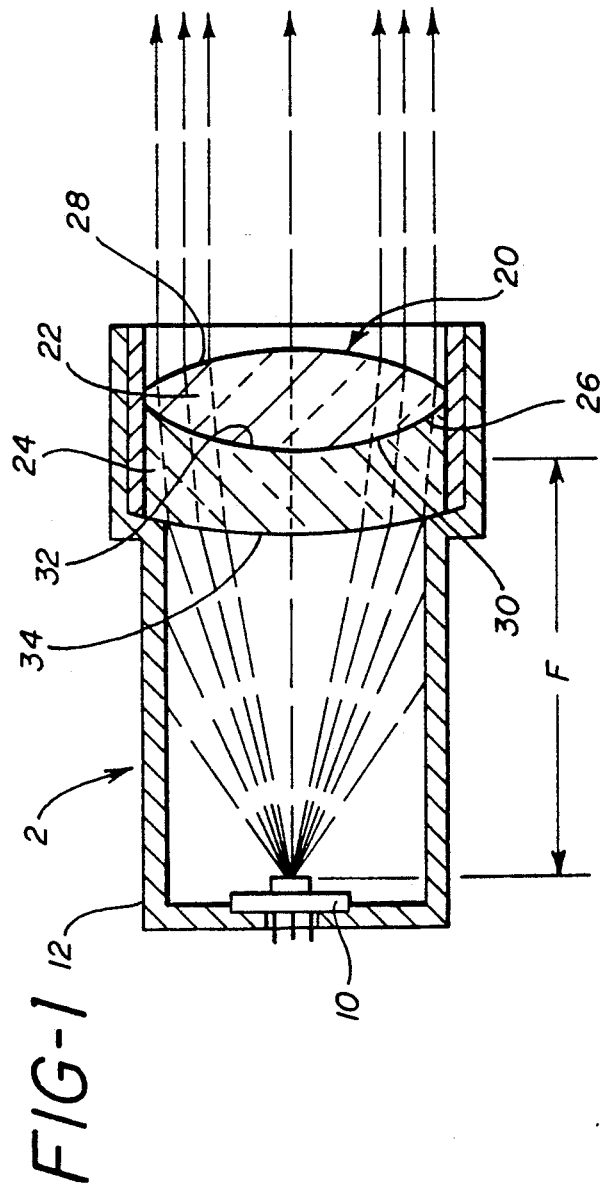
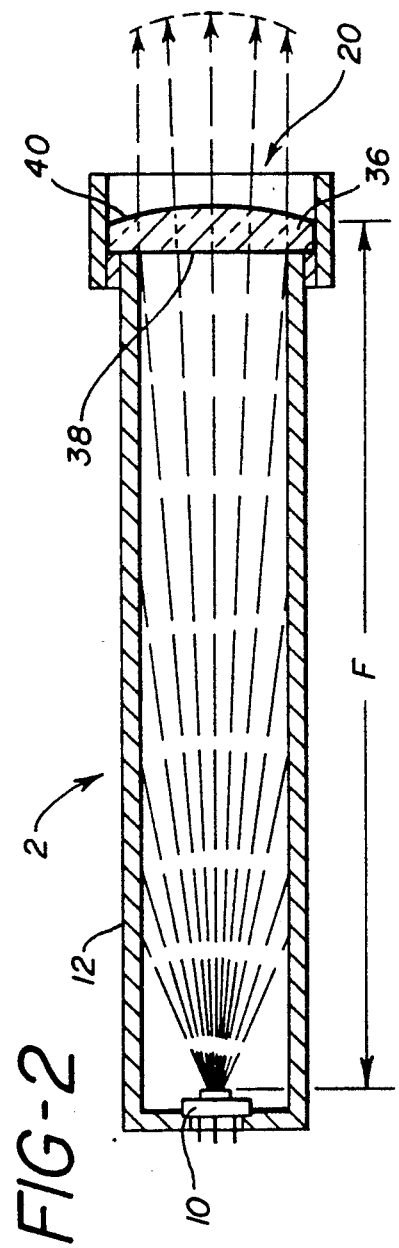

FOCUS COMPENSATING LENS FOR USE IN EXTREME TEMPERATURES

BACKGROUND OF THE INVENTION

The present invention relates to temperature effects on laser instruments, and in particular, to a lens whose change in refractive index with temperature and wavelength compensates for temperature effects on both the wavelength of light produced by a laser source and the length of the mounting for the lens and source.

Laser instruments have found wide application in many industries including construction and agriculture, where laser instruments are subjected to uncontrolled and often harsh temperature conditions. Some such instruments, for example automatic levelling instruments, include transmitters which are designed to project a laser beam over large distances and to establish a plane of light for reception or reflection by a target. The transmitter typically includes a laser source, such as a laser diode or He-Ne laser tube, a lens which produces a substantially collimated laser beam, and a rotating mirror or other device to establish a plane of laser light. In many cases, the lens used with a laser diode is a triplet lens, comprised of three lens elements separated by air spaces. The laser diode source and lens are typically assembled on or in a mounting structure, such as a tube or "barrel", where they are separated by a fixed, design distance equal to the focal length. The laser diode source is thus positioned at the focus of the lens to produce a laser beam having desired beam characteristics such as collimation or a minimum focused spot size at design distances.

In some construction and agricultural applications laser instruments may be subjected to wide variations in temperature from ambient, i.e. approximately 20° Centigrade (°C.). Changes in temperature, T, cause a number of changes in the laser transmitter, however. The wavelength of light emitted by a laser source, particularly a laser diode, will shift, causing a change in the index of refraction, n, of the lens corresponding to its Abbe V-number, and the index of refraction of lens materials will change due to its $\Delta n/\Delta T$ characteristic, both of which defocus the lens. Further, the mounting expands or contracts, changing the separation between the laser source and the lens, further defocusing the transmitter. In turn, these changes adversely effect the desired beam characteristics, such as collimation or minimum focused spot size at design distances. Such changes are more pronounced in transmitters which use laser diodes, as the separation between a laser diode source and lens is small, and the effect of temperature on the wavelength of light produced by the diode is significant.

In some existing laser transmitters these temperature effects have simply been endured without remedy. In others, multiple material mounting structures have been developed which attempt to expand and contract the mounting to match the changes in the focal length of the lens. However, no single mounting material has been found to match such changes, and the mounting structures have become both more complex and expensive than is desirable.

Accordingly, less expensive and less complex solutions are sought to the problems induced by temperature effects in laser instruments, particularly where laser diode sources are used.

SUMMARY OF THE INVENTION

The present invention satisfies this need by providing a focus compensating structure in which the lens compensates for the effect of temperature upon the design distance between the lens and the laser source. A substantially collimated beam is thus produced and maintained throughout a broad range of operating temperatures, approximately ±50° C. from ambient.

In accordance with the present invention, a lens is provided which has an overall index of refraction which changes with temperature and wavelength. This change in index of refraction changes the focal point of the lens for the laser light in an amount which substantially compensates for the defocusing caused by temperature effects on the mounting length and laser light wavelength. Thus, the laser source remains positioned at the focal point of the lens throughout a broad range of temperatures, and the resulting laser beam remains substantially collimated or focused.

The lens of the present invention includes one or more lens elements which produce a laser beam having desired beam characteristics. It is understood that the present invention may be used in applications in which substantially collimated or non-collimated laser light is need. While "collimation" refers to perfectly parallel rays of light, the term, "substantially collimated", includes both laser beams of collimated light as well as laser beams having focal lengths which produce a focused spot size at a distance. The latter behave much like the former. Non-collimated laser beams have shorter focal lengths. The need for substantially collimated or non-collimated laser light is determined by the sensor and range of a particular application. At least one and, typically, two lens elements are required to satisfy the optical requirements for producing a substantially collimated beam from a laser diode, which acts much like a point source. Laser light is produced at large angles from a laser diode source. As the amount of laser light to be collected therefrom and the angle of collection will determine the complexity of the lens, more than two lenses may be desired for particular applications. Regardless, in accordance with the present invention, where a laser diode source is used the lens is preferably a cemented doublet. The cemented doublet includes first and second lens elements whose first and second lens materials, respectively, are chosen for their change in refractive index with temperature and wavelength. The first and second lens elements are cemented together by an optical adhesive which provides a substantially transparent, air-tight seal between matching surfaces. Changes in the index of refraction with temperature and wavelength affect the focus of the lens sufficiently to compensate for the changes in the mounting length and laser light wavelength and maintain the laser source at the focal point of the lens to produce a substantially collimated or focused beam.

Where He-Ne laser sources are used in laser instruments, the temperature effect on the He-Ne source wavelength is much less, and the temperature effect on the mounting structure is less significant as the long focal length lenses used for collimation are less sensitive to focus changes. The need for focus compensation with temperature is much less significant, and therefore the present invention is directed primarily to laser sources which act like point sources, such as laser diode sources.

Accordingly, it is an object of the present invention to provide a focus compensating structure having a lens which adjusts its focus with temperature and wavelength to substantially compensate for both the temperature effect on the separation between the lens and laser source on the mounting and the temperature effect on the wavelength of laser light emitted from a source, to produce substantially collimated or focused laser light throughout a broad range of operating temperatures.

It is a further object of the present invention to provide a doublet lens having lens materials whose index of refraction changes with temperature and wavelength to compensate for temperature effects on the mounting and laser diode, and maintain the projection of a substantially collimated beam of laser light for use over long distances.

BRIEF DESCRIPTION OF THE DRAWINGS

FIG. 1 is a schematic cross sectional view of the preferred focus compensating structure of the present invention.

FIG. 2 is a schematic cross sectional view of a second representative focus compensating structure of the present invention.

DETAILED DESCRIPTION OF THE PREFERRED EMBODIMENT

Figure 3:
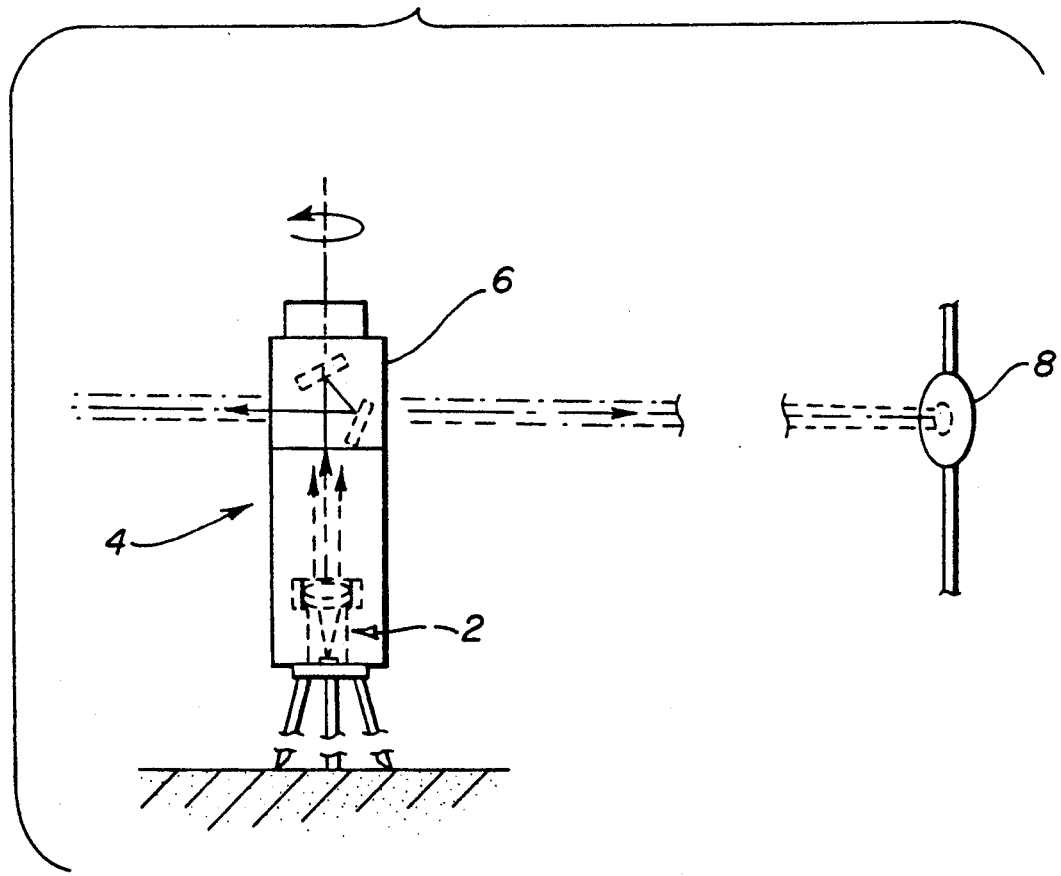
FIG. 3 is a schematic representative view of the focus compensating structure of the present invention shown embodied in a laser transmitter.

Referring to FIGS. 1 and 2, a focus compensating structure 2 is shown in which the lens 20 compensates for the effect of temperature upon the design distance F between the lens 20 and the laser source 10, and the effect of temperature on the wavelength of laser light produced by the laser source 10. The laser source 10 of the present invention is preferably a laser diode, as shown. At least one, and preferably, two lens elements are required to satisfy the optical requirements for producing a substantially collimated beam from a laser diode, as shown representatively in FIGS. 2 and 1, respectively. As shown therein, both the laser source 10 and lens 20 are positioned on mounting 12. Substantially collimated light is produced when the laser source is positioned at the focus of the lens 20. Thus, the design distance F is equal to the focal length of the lens 20 at an ambient design temperature of approximately 20° Centigrade (°C.) for the design wavelength of laser source 10. As indicated in FIG. 1, laser light is produced at large angles from a laser diode source. The greatest angle of laser light to be collected from the laser diode will determine the complexity of the lens 20 required, and thus, more than two lens elements may be desired for particular applications.

In accordance with the preferred embodiment of the present invention in FIG. 1, the lens 20 preferably includes two lens elements 22, 24 configured as a cemented doublet which produce a substantially collimated laser beam. The first and second lens elements 22, 24 are made of first and second lens materials, respectively, which are chosen for their change in refractive index with temperature and wavelength. These changes in the index of refraction with temperature and wavelength affect the focus of the lens 20 sufficiently to compensate for the temperature effects on the mounting length and laser light wavelength which defocus the lens 20. Lens 20 thereby maintains the laser source 10 at the focal point of the lens 20 and produces a substantially collimated beam over a broad range of operating temperatures.

As further shown in FIG. 1, the first and second lens elements 22, 24 are cemented together by an optical adhesive 26 which provides an air-tight seal between matching surfaces. The means for mounting both the lens 20 and laser source 10, mounting 12, is preferably a tube or barrel.

FIG. 3 illustrates the use of the focus compensating structure 2 in a transmitter 4. The focus compensating structure 2 produces a substantially collimated beam which is reflected off of a rotating mirror assembly 6 to form a plane of laser light, as shown. The transmitter 4 is typically part of a laser instrument, such as an automatic leveling device, which includes a target 8, such as a reflector or sensor, and may include, as well, electronics and a control box (not shown).

By way of illustration, and without intention to limit the present invention thereto, two embodiments of a focus compensating structure 2, in accordance with the present invention, are set forth below.

EXAMPLE 1

Laser source 10, a laser diode, such as Model 4442N-44 available from Mitsubishi, Nagasaki, Japan, produces laser light with a wavelength of substantially 780 nanometeres (nm) at approximately 20° C. The laser diode emits a wavelength of substantially 793 nm at 70° C., and 767 nm at −30° C. Laser source 10 is disposed in mounting 12, preferably a barrel of 6061 aluminum, having a coefficient of thermal expansion of $12.6 \times 10^{-6}$/°F. Laser source 10 is connected to a source of electrical power (not shown).

The lens 20, made in accordance with the present invention, is a cemented doublet. As summarized in Table 1 below, the first lens element 22 is made of borosilicate flint glass, which has an index of refraction of $n_d = 1.706$. The index of refraction of the borosilicate glasses indicated change with both temperature and wavelength of light in such a way that the net change in index of refraction in generally linear. The index of refraction of the first lens element 22 varies generally linearly in the temperature and wavelength range of interest between 1.690624 at 70° C., $\lambda = 793$ nm, and 1.691831 at −30° C., $\lambda = 767$ nm. This first lens material is available from Schott Glass Technologies Inc. of Duryea, Pa. as glass No. SFN64. Its first and second surfaces 28, 30, respectively, are convex with radii of 39.06 millimeters (mm) and 26.61 mm. First lens element 22 has a center thickness of 5.2 mm±0.15 mm. The second lens element 24 is also made of borosilicate flint glass, which has an index of refraction of $n_d 1.785$. The index of refraction varies generally linearly in the temperature and wavelength range of interest between 1.765540 at 70° C., $\lambda = 793$ and 1.766678 at −30° C., $\lambda = 767$ nm. This second lens material is also available from Schott Glass Technologies Inc., as glass No. SF56. The first lens element 22 and second lens element 24 differ in lead content, and the second lens element 24 has more lead than the first lens element 22. The third and fourth surfaces 32, 34, of second lens element 24 are concave and convex, respectively. The radius of the third surface 32 is 26.61 mm, matching that of the second surface 30. The fourth surface 34 has a radius of 263.59 mm. The second lens element 24 has a center thickness of 5.7 mm±0.15 mm. The second and third surfaces 30, 32 are adhesively sealed with optical cement, preferably Norland Optical Adhesive 61, available from Norland Products Inc., New Brunswick, N.J.

In this example, lens 20 has an overall outside diameter of 21.8 mm±0.025 mm, and a clear aperture of 19.3 mm. The design distance equal to the focal length of lens 20 at 20° C. is 56.68 mm.

TABLE 1

| Material | First Lens Element borosilicate flint (SFN64) | | Second Lens Element borosilicate flint (SF56) | |
|---|---|---|---|---|
| Refractive index | | | | |
| at 70° C., λ = 793 nm | 1.690624 | | 1.765540 | |
| 20° C. (ambient), λ = 780 nm | 1.691214 | | 1.766089 | |
| −30° C., λ = 767 nm | 1.691831 | | 1.766678 | |
| Clear aperture (mm) | 19.3 | | 19.3 | |
| Center thickness (mm) | 5.2 ± 0.15 | | 5.7 ± 0.15 | |
| Surface | first | second | third | fourth |
| Radius (mm) | 39.06 (convex) | 26.61 (convex) | 26.61 (concave) | 263.59 (convex) |

The laser diode produces laser light with a wavelength of 780 nm at approximately 20° C. Varying generally linearly 0.26 nm/°C., at the extremes of ±50° C., the wavelength of laser light produced at 70° C. is 793 nm, while at approximately −30° C. the wavelength is 767 nm.

The focus compensation of lens 20 may be confirmed, as follows:

For a ΔT = +50° C., i.e. T = 70° C., the wavelength of a typical laser diode will increase 13 nm, that is, $$\frac{\Delta\lambda}{\Delta T} = \frac{0.26 \text{ nm}}{°C.} \times 50° C. = 13 \text{ nm}$$

The focus change for this 56.68 mm focal length lens at a wavelength of 793 nm will be $5.77 \times 10^{-2}$ mm for a 50° C. temperature increase, based upon calculations known in the art, given the index of refraction for the materials of the first and second lens elements 22, 24. Such calculations may be carried out on personal computers using any one of numerous, commercially available ray trace optics programs, for example, SODA, available from Don Small Optics, of El Toro, Ca.; Code V TM, available from Optical Research Associates, of Pasadena, Calif.

The expansion of 56.68 mm of aluminum over a 50° C. increase, produces an increased distance between the source 10 and the lens 20 of, $$\Delta L_{6061 \text{ aluminum}} = 12.6 \times 10^{-6}/°F. \times 9° F./5° C. \times 50° C. \times 56.68 \text{ nm}$$
$$= 6.43 \times 10^{-2} \text{ mm}$$

Thus, change in the focus of the lens with temperature compensates for approximately 90% of the temperature effect on the diode and mounting, $$\frac{5.77 \times 10^{-2} \text{ mm}}{6.43 \times 10^{-2} \text{ mm.}} \times 100 \approx 90\%,$$

Over a ±50° C. range, the lens will be out of focus only $$|6.43 \times 10^{-2} \text{ mm}| - |5.77 \times 10^{-2} \text{ nm}| = 6.6 \times 10^{-2} \text{ mm},$$

or ±6.6 microns, which will have a negligible effect on collimation, as well as a negligible, less than 1%, effect on spot size over a distance of approximately 1000 feet, as determined by equations known in the art.

EXAMPLE 2

In the second example, the lens 20 comprises a single lens element 36, as shown in FIG. 2. Laser source 10, a laser diode, and mounting 12 are the same as those described above. As summarized in Table 2 below, the single lens element 36 is made of borosilicate flint glass. The index of refraction varies generally linearly in the temperature and wavelength range of interest between 1.784824 at 70° C., λ=793 nm, and 1.786489 at −30° C., 30° C., λ=767 nm. The index of refraction is 1.785636 at 20° C. (ambient), λ=780 nm. This single lens element material is available from Schott Glass Technologies Inc. of Duryea, Pa. as glass No. SFL 6. Single lens element 36 is a plano-convex lens having a substantially planar first surface 38 facing laser source 10, and a second surface 40, which is convex, having a radius of 70.13 (mm). Single lens element 36 has a center thickness of 2.54 mm±0.2 mm.

In this second example, the single lens element 36 has an overall outside diameter of 15.24 mm±0.025 mm to allow for the mounting to grip the lens, and a clear aperture of 12.7 mm. The design distance, equal to the focal length of the single lens element 36 at 20° C., is 69.85 mm.

TABLE 2

| Material | Single Lens Element borosilicate flint (SFL6) | |
|---|---|---|
| Refractive index | | |
| at 70° C., λ = 793 nm | 1.784824 | |
| 20° C. (ambient), λ = 780 nm | 1.785636 | |
| −30° C., λ = 767 nm | 1.786489 | |
| Clear aperture (mm) | 12.7 | |
| Center thickness (mm) | 2.54 ± 0.15 | |
| Surface | first | second |
| Radius (mm) | ∞ (convex) | 70.03 (convex) |

Calculations known in the art may again be made, given the index of refraction, to find the focus change for the single lens element 36 at 70° C. and 793 nm. The expansion of 69.85 mm of aluminum may also be calculated in the manner set forth above, and the values of focus change and material expansion may be compared to show that the change in focus compensates for approximately 90% of the temperature effect on the diode and mounting. The single lens element 36 will also be out of focus in an amount which will have a negligible effect on collimation.

A single lens element 36 in accordance with the present invention is useful in applications where less laser light is required from laser source 10, such as a laser diode. Compared to the cemented doublet lens 20 of Example 1, the single lens element 36 of Example 2 has a smaller clear aperture, and longer focal length, effectively capturing and collimating less laser light. Thus, a laser instrument, such as a laser transmitter 4, using a single lens element 36 in accordance with this example, would be preferred for applications in which a substantially collimated laser beam is to be projected over somewhat shorter distances than discussed with regard to the lens 20 of Example 1.

Again, the above examples are illustrative, and no attempt is made to limit the scope of the invention thereto. The precise focus compensating structure 2, materials and lens elements applied in accordance with the present invention will depend on the particular demands of the application.

To generalize the manner in which one arrives at such a design, it is first necessary to consider the amount of light needed at the target, the amount of light which must therefore be captured from the particular laser source by the lens, and the distance over which the substantially collimated beam is to be projected, to determine the complexity of the lens and number of lens elements needed to collimate the beam. Next, temperature range of operation, the variation in wavelength of laser source 10 with temperature, and the coefficient of expansion of the material of mounting 12 must be considered in selecting the appropriate materials for the lens elements of lens 20. Finally, the change in overall index of refraction and the change in focus, as determined by a ray trace program, may be compared to determine whether the temperature effects on the laser source 10 and mounting 12 are sufficiently compensated by lens 20 in the temperature range of interest to maintain the desired collimation of the laser beam.

While certain representative embodiments and details have been shown for purposes of illustrating the invention, it will be apparent to those skilled in the art that various changes in the apparatus and method disclosed herein may be made without departing from the scope of the invention, which is defined in the appended claims.

What is claimed is:

1. A focus compensating structure for producing a substantially collimated or focused laser beam for a laser transmitter subject to temperature variation, said structure comprising:

means for mounting comprising one or more materials and having a coefficient of expansion related to temperature;

laser means, disposed on said means for mounting, for producing laser light having a wavelength which varies with temperature, said laser means producing a design wavelength at a design temperature;

lens means for redirecting at least a portion of said laser light from said laser means to produce a laser beam, said lens means having a focal point which depends on the temperature and wavelength of laser light refracted therethrough, said lens means disposed on said means for mounting and separated from said laser means at a design distance, said design distance being substantially equal to the focal length of said lens means at said design wavelength, whereby said laser means is at the focal point of said lens means;

said lens means further comprising means for compensating for both the effect of temperature change upon said design distance separating said lens means from said laser means on said means for mounting, and the effect of temperature change upon said wavelength of laser light produced by said laser means;

whereby said laser means remains substantially at the focal point of said lens means such that said laser beam produced is substantially unaffected by temperature change.

2. The structure of claim 1 wherein:

said lens means further comprises one or more lens elements in contiguous relationship, each said lens element having a different index of refraction; and said lens means has an overall index of refraction which varies with temperature and wavelength, and which substantially compensates for the effect of temperature change on both said design distance and on said wavelength of laser light produced by said laser means.

3. The structure of claim 2 wherein said lens means comprises first and second lens elements made of first and second lens materials, respectively, said first and second lens materials having first and second indexes of refraction, respectively, which vary with temperature and wavelength and which combine to substantially compensate for the effect of temperature on said design distance and on said wavelength of laser light produced by said laser means.

4. The structure of claim 3 wherein said first and second lens elements are comprised of borosilicate optical glass.

5. The structure of claim 2 wherein said lens means comprises first, second and third lens elements having an overall index of refraction which varies with temperature and wavelength and which combine to substantially compensate for the effect of temperature on said design distance and on said wavelength of laser light produced by said laser means.

6. The structure of claim 2 wherein said lens means comprises a single lens element.

7. The structure of claim 2 wherein said lens means comprises at least two lens elements in contiguous relationship each having different indexes of refraction which combine to vary the focal point of said lens means with temperature change to compensate for both the effect of temperature change on the design distance between said laser means and said lens means, and the effect of temperature change upon said wavelength of said laser light.

8. The structure of claim 7 wherein adjacent ones of said at least two lens elements in contiguous relationship have adjacent surfaces which share a common radius.

9. The structure of claim 1 wherein said means for mounting is substantially comprised of a single material.

10. The structure of claim 1 wherein said laser means comprises a laser diode.

11. The structure of claim 1 wherein said lens means produces and maintains a substantially collimated laser beam from at least a portion of said laser light.

12. The structure of claim 1 wherein said lens means produces and maintains a focused laser beam having a spot size from at least a portion of said laser light.

13. A focus compensating structure for producing a substantially collimated or focused laser beam for a laser transmitter subject to temperature variation, said structure comprising:

means for mounting comprising one or more materials and having a coefficient of expansion related to temperature;

laser means, disposed on said means for mounting, for producing laser light having a wavelength which varies with temperature, said laser means producing a design wavelength at a design temperature;

lens means for redirecting at least a portion of said laser light from said laser means, said lens means having a focal point, at a given temperature, for each wavelength of laser light, and said lens means comprising first and second lens elements made of first and second lens materials, respectively, wherein:

said first lens element has first and second surfaces which are convex;

said second lens element has third and fourth surfaces which are concave and convex respectively; and said second and third surfaces have a common radius; and said lens means are disposed on said means for mounting and separated from said laser means at a design distance, said design distance being substantially equal to the focal length of said lens means at said design wavelength, whereby said laser means is at the focal point of said lens means;

said lens means further comprising means for compensating for the effect of temperature upon said design distance and upon said wavelength of laser light produced by said laser means, comprising first and second lens materials having first and second indexes of refraction, respectively, which vary with temperature and wavelength, and which combine such that said lens means has an overall index of refraction which varies with temperature and wavelength, such that said lens means substantially compensates for the effect of temperature on said design distance and on said wavelength of laser light produced by said laser means;

whereby said laser means remains substantially at the focal point of said lens means.

14. The structure of claim 13 further comprising adhesive means for sealing said second surface to said third surface to produce an airtight fit.

15. A focus compensating structure for producing a substantially collimated or focused laser beam for a laser transmitter subject to temperature variation, said structure comprising:

means for mounting comprising one or more materials and having a coefficient of expansion related to temperature, said means for mounting substantially comprised of aluminum;

laser means, disposed on said means for mounting, for producing laser light having a wavelength which varies with temperature, said laser means producing a design wavelength at a design temperature, and said laser means comprising a laser diode having a design wavelength of substantially 780 nanometers (nm);

lens means for redirecting at least a portion of said laser light from said laser means, said lens means having a focal point, at a given temperature, for each wavelength of laser light, said lens means disposed on said means for mounting and separated from said laser means at a design distance, said design distance being substantially equal to the focal length of said lens means at said design wavelength, whereby said laser means is at the focal point of said lens means;

said lens means comprising a cemented doublet having first and second lens elements comprised of borosilicate flint glass, said first and second elements having a common radius adhesively connected, wherein:

said first lens element has a first, convex surface with a radius of 39.06 millimeters (mm), and a second, convex surface with a radius of 26.61 (mm); and said second lens element has a third, concave surface with a radius equal to said second surface, and a fourth, convex surface with a radius of 263.59 mm, said fourth surface generally facing said laser diode; and said laser diode is separated from said lens means by a focal length of 56.68 mm said lens means further comprising means for compensating for the effect of temperature upon said design distance and upon said wavelength of laser light produced by said laser means;

whereby said laser means remains substantially at the focal point of said lens means.

16. A focus compensating structure for producing substantially collimated or focused laser beams for a laser transmitter subject to temperature variation, said structure comprising:

means for mounting, said means for mounting comprising of one or more materials and having a coefficient of expansion related to temperature;

laser means for producing laser light, said laser means disposed on said means for mounting and adapted to produce laser light having a wavelength which varies with temperature, said laser means producing a design wavelength at a design temperature; and lens means for redirecting at least a portion of said laser light from said laser means, said lens means disposed on said means for mounting and separated from said laser means at a fixed distance;

said lens means further comprising means for compensating for the effect of temperature change upon both said fixed distance and upon said wavelength of laser light produced by said laser means;

whereby said laser light produced by said laser means remains redirected as a substantially collimated or focused laser beam over a range of temperatures.

17. The structure of claim 16 wherein:

said laser means comprises a laser diode producing laser light in non-collimated form having a wavelength which varies with temperature; and said lens means has an overall index of refraction which varies with temperature to compensate for the effect of temperature change upon both said distance separating said lens means from said laser means, and upon said wavelength of laser light produced by said laser means.

18. A method for compensating for thermal effects in laser sources and mounting structures used to substantially collimate or focus laser beams with a focus compensating lens, said method comprising the steps of:

providing a laser source mounted in a means for mounting, wherein said laser source produces laser light which varies in wavelength with temperature and said means for mounting varies in length with temperature;

providing a lens means for redirecting at least a portion of said laser light, wherein said lens means is disposed in said means for mounting at a distance from said laser source defined as the design distance, said design distance comprising the focal length of said lens means at a design temperature, and wherein said lens means has an index of refraction which varies with temperature and wavelength;

changing the ambient temperature from said design temperature to a new temperature to change the wavelength of said laser source and to change the distance between said laser source and said lens means;

said step of changing the ambient temperature further changing said index of refraction of said lens means to produce a new focal point for said lens means which substantially compensates for said change in wavelength of said laser source and change in distance;

whereby said laser source remains substantially at the focal distance of said lens means at the new temperature, and said laser light remains substantially collimated or focused.

19. The method of claim 18 wherein:

said step of providing a laser source comprises the steps of providing a laser diode on said means for mounting, and producing laser light with said laser diode is non-collimated form; and said step of providing a lens means for redirecting at least a portion of said laser light comprises the step of redirecting said laser light in non-collimated form to produce a laser beam.

20. A focus compensating structure for redirecting laser light and producing substantially collimated or focused laser beams for a laser transmitter subject to temperature variation, said structure comprising:

means for mounting, said means for mounting comprising of one or more materials and having a coefficient of expansion related to temperature;

laser means for producing laser light, said laser means comprising a laser diode disposed on said means for mounting, said laser diode producing laser light in non-collimated form having a wavelength which varies with temperature; and lens means for redirecting a portion of said laser light from said laser diode, said lens means disposed on said means for mounting and separated from said laser means at a distance at which a desired laser beam is produced, which distance varies with temperature;

said lens means further comprising one or more lens elements in contiguous relationship, said lens means having an overall index of refraction which varies with temperature to compensate for the effect of temperature change upon both said distance separating said lens means from said laser means, and upon said wavelength of laser light produced by said laser means;

whereby said laser light produced by said laser means remains redirected as a substantially collimated or focused laser beam over a range of temperatures.

* * * * *

UNITED STATES PATENT AND TRADEMARK OFFICE
CERTIFICATE OF CORRECTION

PATENT NO.  : 5,225,928
DATED       : July 6, 1993
INVENTOR(S) : John P. Dugan

It is certified that error appears in the above-indentified patent and that said Letters Patent is hereby corrected as shown below:

Col. 11, line 17,    "is non-collimated form" should read --in non-collimated form--.

Signed and Sealed this

Twenty-second Day of February, 1994

Attest:

BRUCE LEHMAN

*Attesting Officer*    *Commissioner of Patents and Trademarks*